(12) United States Patent
Tsang

(10) Patent No.: US 6,473,087 B1
(45) Date of Patent: Oct. 29, 2002

(54) METHOD AND SYSTEM FOR CONCURRENT PROCESSING OF SLICES OF A BITSTREAM IN A MULTIPROCESSOR (MP) SYSTEM

(75) Inventor: Ekman Tsang, Vancouver (CA)

(73) Assignee: Silicon Magic Corporation, Sunnyvale, CA (US)

( * ) Notice: Subject to any disclaimer, the term of this patent is extended or adjusted under 35 U.S.C. 154(b) by 0 days.

(21) Appl. No.: 09/464,327

(22) Filed: Dec. 15, 1999

(51) Int. Cl.⁷ .............................................. G06F 15/80
(52) U.S. Cl. ........................ 345/505; 345/504; 345/544; 345/555
(58) Field of Search .............................. 345/504, 505, 345/502, 544, 555, 564, 565, 559; 382/232, 244–246; 709/247; 710/68

(56) References Cited

U.S. PATENT DOCUMENTS

| | | | | |
|---|---|---|---|---|
| 5,440,746 A | * | 8/1995 | Lentz .......................... | 345/504 |
| 5,761,516 A | * | 6/1998 | Rostoker et al. ............ | 709/248 |
| 5,812,791 A | * | 9/1998 | Wasserman et al. ........ | 709/247 |
| 5,898,897 A | * | 4/1999 | Son et al. ..................... | 710/68 |
| 6,131,161 A | * | 10/2000 | Linnartz ..................... | 382/232 |

\* cited by examiner

Primary Examiner—Kee M. Tung
(74) Attorney, Agent, or Firm—Sawyer Law Group LLP

(57) ABSTRACT

A method and system for concurrent processing of slices of a bitstream in a multiprocessor (MP) system is disclosed. The MP system includes a number of identical processors and a common memory. The memory is for receiving a plurality of bitstreams (preferably MPEG2 bitstreams) as a plurality of slices. The method and system comprises accessing a semaphore register by one of the plurality of processors and searching for an associated slice within the memory by the one processor. The method and system further comprises processing the associated slice by the one processor. Finally, the method and system comprises updating a memory location which holds the last address of the associated slice by the one processor; wherein subsequent processors search for each of the plurality of slices from the updated last address in the register. A system and method in accordance with the present invention provides for intercommunication between the plurality of processors within a multiprocessing system. By determining within a semaphore the most recent location of the decoding task, the time and effort spent on searching for new starting location of new task is minimized. Accordingly, the decoding process is parallel, and in most cases averages out the decoding demand on the processors. Accordingly, each of the processors within the multiprocessor system, only needs to search from the address of the bitstream through the remainder of the bitstream to obtain the slice. This process is repeated for each of the processors until the bitstream is processed. Therefore, in a system and method in accordance with the present invention there is no requirement that a processor search from the beginning of the bitstream to the point where the slice originates because the address pointers are updated as at the point where the last slice has been operated on. This provides for a more efficient system for processing bitstreams in a parallel fashion.

14 Claims, 6 Drawing Sheets

General Structure of the Multi-processor System for Efficient MPEG Bitstream Decoding Figure 1. General Structure of a MPEG Bitstream Figure 2. General Structure of the Multi-processor System
for Efficient MPEG Bitstream Decoding Master Processor Operation Slave Processor Operation

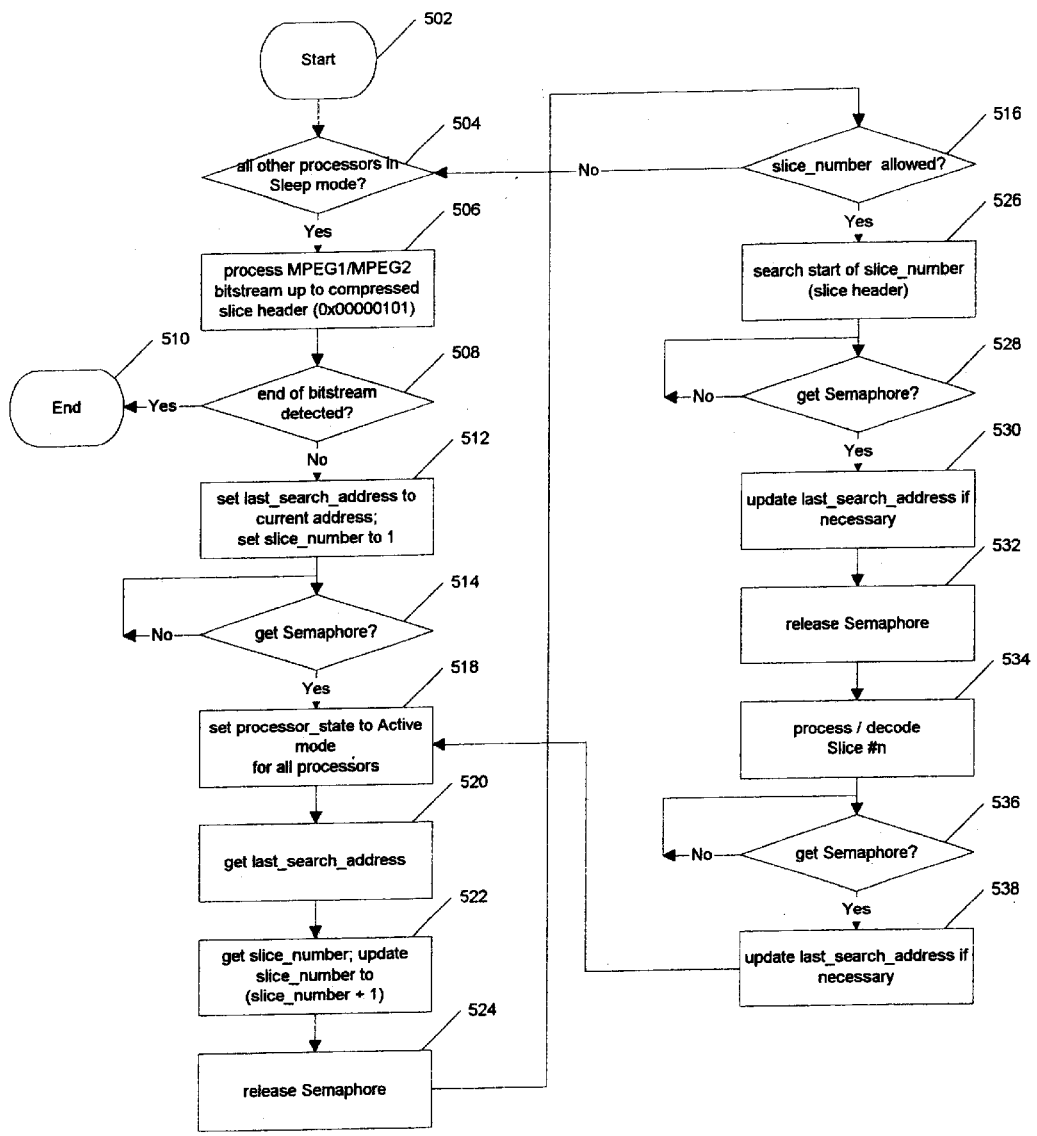
Figure 5. Flow Diagram in MPEG Bitstream Decoding for Master Processor

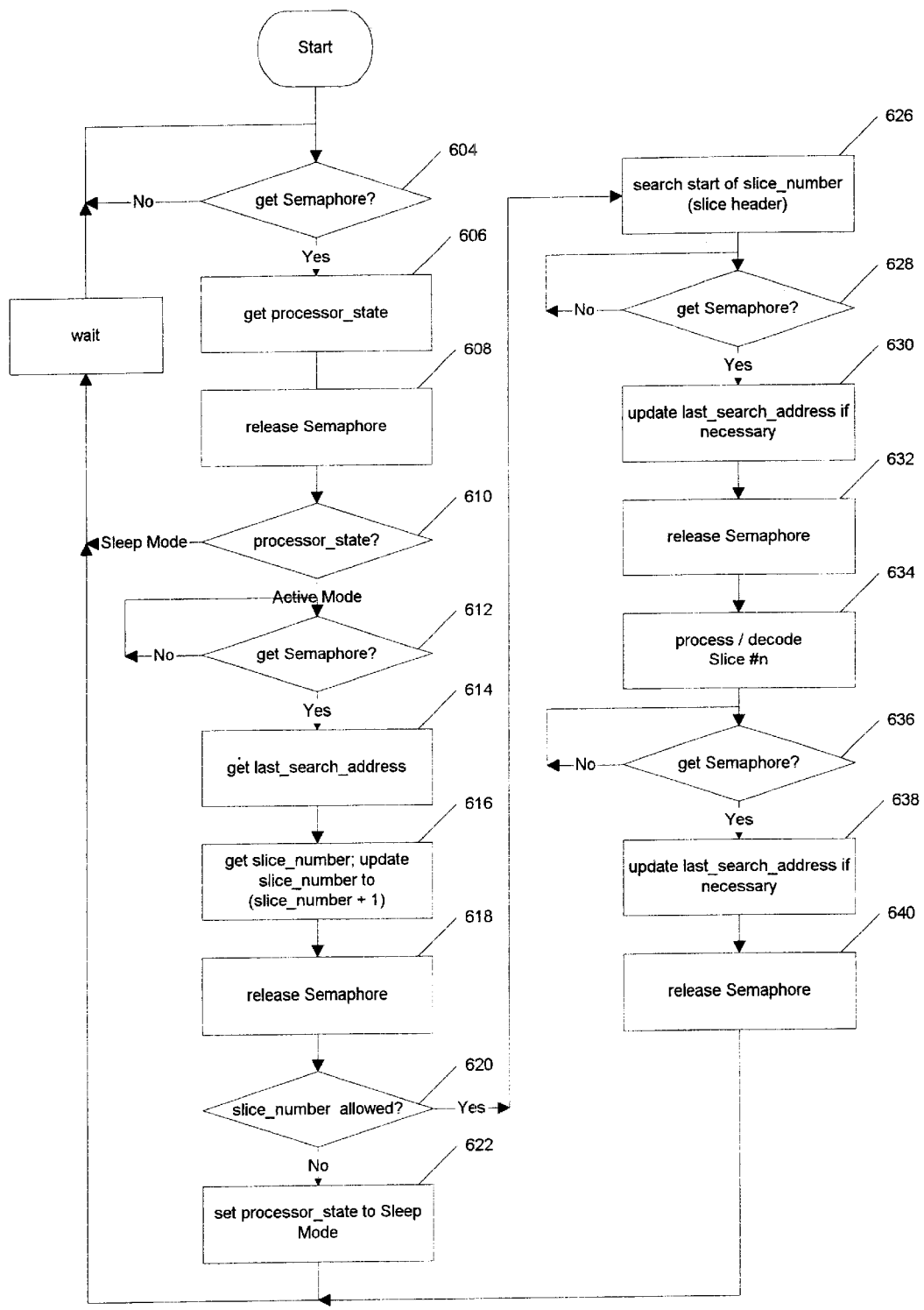
Figure 6. Flow Diagram in MPEG Bitstream Decoding for Slave Processors.

METHOD AND SYSTEM FOR CONCURRENT PROCESSING OF SLICES OF A BITSTREAM IN A MULTIPROCESSOR (MP) SYSTEM

FIELD OF THE INVENTION

The present invention relates to multiprocessor (MP) systems, and particularly to MPEG1/MPEG2 bitstream decoding utilizing multi-processor systems.

BACKGROUND OF THE INVENTION

Bitstreams such as an MPEG bitstream are utilized to provide pictures or images in processing systems. FIG. 1 illustrates the general structure 10 of an MPEG bitstream. The MPEG bitstream can be broken down into a number of variable-length compressed pictures 12 and 14, each of which in turn can be broken down into a number of variable-length compressed slices 20-1, 20-2, 20-n and 22-1, 22-2 and 22-n. Since these compressed pictures 12 and 14 and slices 20-1 to 22-n are of variable lengths, a single-processor system cannot predict where the start of next slice/picture is in the bitstream, until it has finished decoding the current slice/picture.

To enhance decoding efficiency and speed, a multi-processor system may be used to decode a single MPEG1/MPEG2 bitstream. However, a typical multi-processor system does not know how to take advantage of its architecture in order to enhance decoding and searching speed and efficiency, and normally just use a single processor within the multiprocessor system to decode MPEG1/MPEG2 bitstreams.

Traditionally when a multi-processor system decodes MPEG1/MPEG2 bitstreams, each processor in the multi-processor system is assigned a number of compressed slices to process. The Ad-hoc method would be for each processor to be pre-assigned a certain of compressed slices, search for them, and decode them. However, the searching of the slices are time-consuming, does not leverage on the knowledge of what the other processors have obtained, and the computing power of all the processors in the multiprocessor system is not optimally allocated. Accordingly, what is needed is a system and method for concurrently process MPEG1/MPEG2 bitstreams utilizing multiple processors in an efficient and accurate manner. The present invention addresses such a need.

SUMMARY OF THE INVENTION

A method and system for concurrent processing of slices of a bitstream in a multiprocessor (MP) system is disclosed. The MP system includes a number of identical processors and a common memory. The memory is for receiving a plurality of bitstreams (preferably MPEG2 bitstreams) as a plurality of slices. The method and system comprises accessing a semaphore register by one of the plurality of processors and searching for an associated slice within the memory by the one processor. The method and system further comprises processing the associated slice by the one processor. Finally, the method and system comprises updating a memory location which holds the last address of the associated slice by the one processor; wherein subsequent processors search for each of the plurality of slices from the updated last address in the register.

A system and method in accordance with the present invention provides for intercommunication between the plurality of processors within a multiprocessing system. By determining within a semaphore the most recent location of the decoding task, the time and effort spent on searching for new starting location of new task is minimized. Accordingly, the decoding process is parallel, and in most cases averages out the decoding demand on the processors.

Accordingly, each of the processors within the multiprocessor system, only needs to search from the address of the bitstream through the remainder of the bitstream to obtain the slice. This process is repeated for each of the processors until the bitstream is processed. Therefore, in a system and method in accordance with the present invention there is no requirement that a processor search from the beginning of the bitstream to the point where the slice originates because the address pointers are updated at the point where the last slice has been operated on. This provides for a more efficient system for processing bitstreams in a parallel fashion.

BRIEF DESCRIPTION OF THE DRAWINGS

FIG. 5 is a detailed flow diagram for Bitstream Decoding by the Master Processor.

FIG. 6 is a detailed flow diagram in MPEG Bitstream decoding for the slave processors.

DETAILED DESCRIPTION

Figure 1:
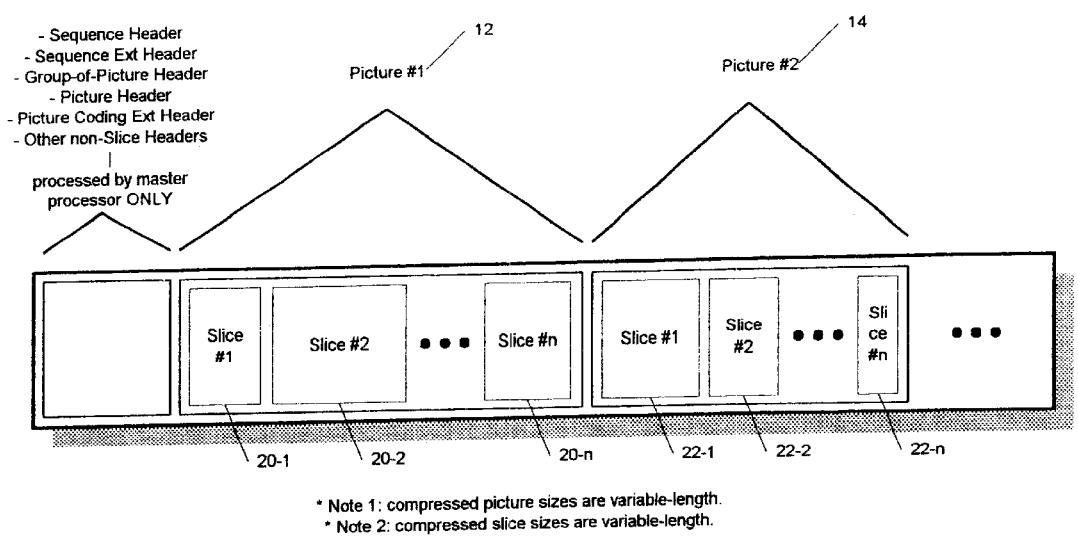
FIG. 1 illustrates the general structure 10 of an MPEG bitstream.

The present invention relates to multi-processor (MP) systems, and particularly to MPEG1/MPEG2 bitstream decoding utilizing multi-processor systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

An improved method and system for concurrent processing of compressed slices in MPEG1/MPEG2 bitstreams utilizing a multi-processor (MP) system is disclosed. The multi-processor system in a preferred embodiment includes a plurality of processors, a common memory, and a semaphore register. The memory has the ability to receive an incoming bitstream. Typically, the bitstream comprises an MPEG1/MPEG2 bitstream. The typical MPEG1/MPEG2 bitstream contains a variable-length compressed pictures, which in turns contain variable-length compressed slices. The semaphore register arbitrates read/write accesses to key memory locations (slice number, latest search address, and processor state) by all processors involved in the decoding of the MPEG1/MPEG2 bitstream.

Traditionally, a number of compressed slices would be assigned to all the processors before slice decoding begins, and the searching of these compressed slices would be done independently by each processor. This kind of MP system algorithm assumes the even distribution of the decoding complexity among the compressed slices assigned to all processors, which in most cases is not true. Furthermore, the time required to search for a slice is the same regardless of which slice is being obtained. Both of these deficiencies are addressed and solved with the new algorithm.

In a system and method in accordance with the present invention, pre-assigned compressed slices are not required. Instead, whenever a processor is free, it will control the semaphore to obtain sole access to the slice number and latest search address memory locations. The processor will obtain the next slice number, and increment the slice number in the memory. This ensures that the next slice will be processed at the earliest time, and not bounded by a particular pre-assigned processor. This scheme maximizes usage among all the processors in the MP system, and time required to decode the bitstream is reduced.

Then it will get the latest search address, which contains the most recent searched location in the bitstream. After it releases the semaphore, it will start looking for slice # obtained, beginning from the address obtained. At both instances when the slice is found and after the slice has been decoded, the processor will again obtain the semaphore, update the latest search address if necessary, and release the semaphore. This address update allows other processors to use the most recent address searched to start the searching, which can reduce the time it takes to reach the actual slice the processors needed to decode.

Therefore, in a system and method in accordance with the present invention there is reduction in both search time and processing time. This system provides a more efficient system for processing MPEG1/MPEG2 bitstreams in a parallel fashion.

To further illustrate the features of the present invention refer now to the following description in conjunction with the accompanying figures.

Figure 2:
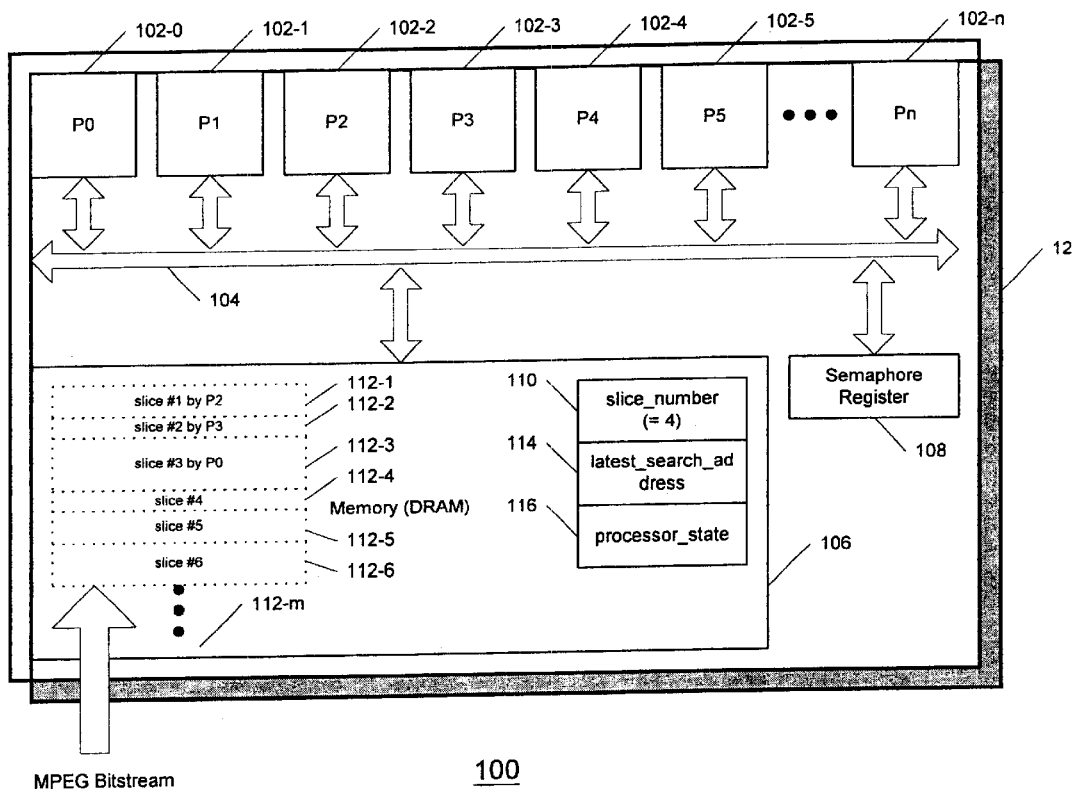
FIG. 2 is a simple block diagram of a multiprocessing system 100 in accordance with the present invention

FIG. 2 is a simple block diagram of a multiprocessing system 100 in accordance with the present invention. As is seen, a plurality of processors 102-0 to 102-n communicate with a bus 104. In this embodiment, processor 102-0 is the master processor and 102-1 through 102-n are slave processors. The master processor 102-0 dispatches work to the other processors 102-1 to 102-n. Initially, the processor 102-0 initializes and starts the other processors. After that, each of the processors 102-1 to 102-n all are on their own and will attempt to access a memory 106 via bus 104.

In a preferred embodiment, the memory 106 is a dynamic random access memory (DRAM). In a preferred embodiment, a semaphore register 108 outside of the DRAM is accessed by the plurality of processors 102-0 to 102-n to determine which processor has control of DRAM 106, and therefore has access to the data which stores the latest starting location. The register 108 is a semaphore accessible by all processors within the MP system, to serialize processor access to certain parts of the memory 106.

The DRAM 106 receives a bitstream, typically an MPEG or an MPEG2 bitstream, and converts that bitstream to a plurality of compressed slices and includes a latest slice number memory location 110, search address 114 and a processor state memory location 116. As is seen, the slices 112-1 to 112-m are variable in length. Each of these slices 112-1 to 112-m are accessed by a particular processor 102-0 to 112-m based upon their slice number. The memory locations 110, 114 and 116 are utilized to minimize the search time. In this embodiment, each slice 112-1 to 112-m is independently operated on by a particular processor 102-0 to 102-n. When one of the plurality of processors 102-0 to 102-n has access to the semaphore the other processors cannot have access to that same semaphore. Accordingly, if one processor is reading or writing data to memory locations 110, 114, 116, the other processors must wait. Accordingly, in a system in accordance with the present invention, the semaphore allows for access to slices of the bitstream. memory in the system receives MPEG1/MPEG2 bitstreams, and stores them in a bitstream buffer (a pre-defined memory region). In addition, the memory 106 also contains data in three memory locations. They are the slice counter, latest search address, and processor state memory locations. The processor which obtains the semaphore is the only processor which will have complete access (read and write) to these three memory locations.

Figure 3:
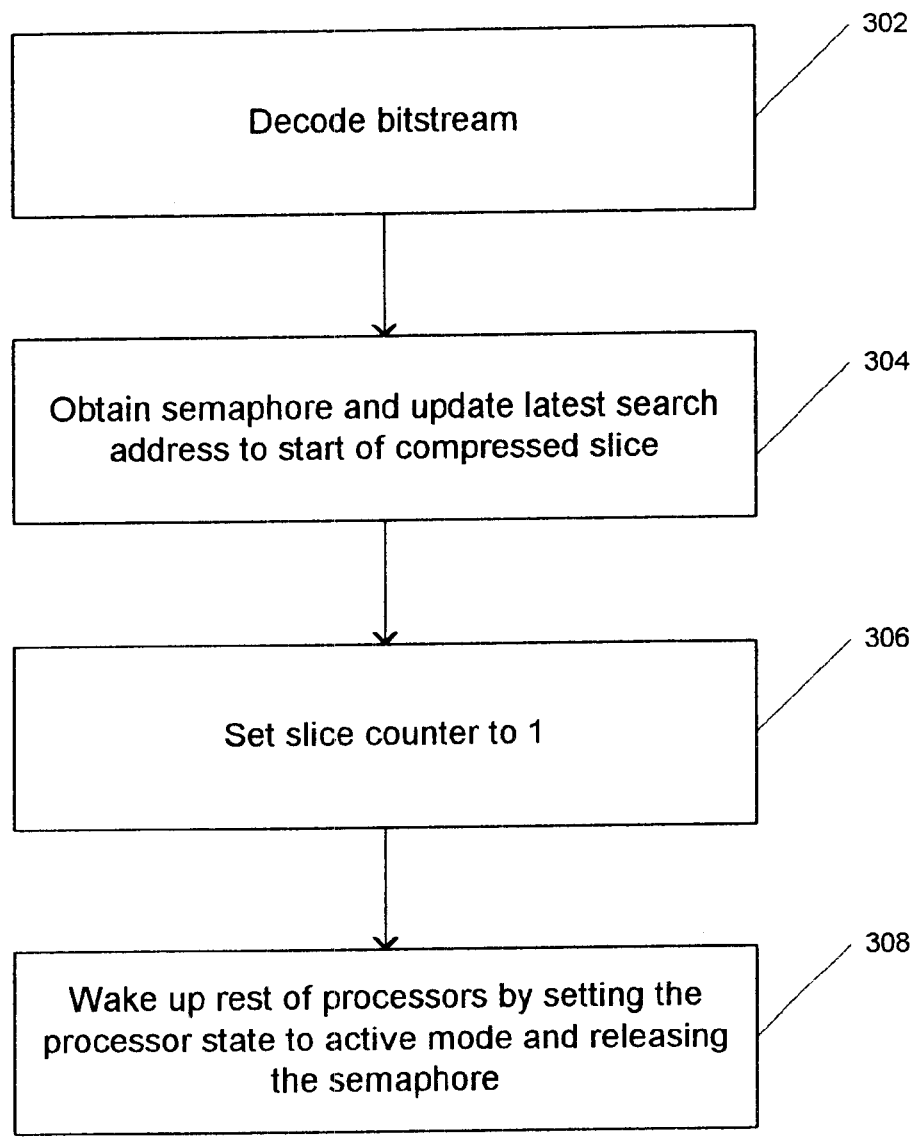
FIG. 3 is a simple flow chart of the master processor operation in the multiprocessor system.

FIG. 3 is a simple flow chart of the master processor operation in the multiprocessor system. A master processor starts by decoding the MPEG1/MPEG2 bitstream up to the discovery of a compressed slice, while all the other processors are in Sleep mode, via step 302. At the start of this new compressed slice (indicated, for example, by a slice header 0x00000101) in the MPEG1/MPEG2 bitstream, the master processor (Pm) obtains the semaphore, and updates the latest search address to the start of the compressed slice, via step 304. The master processor (Pm) then sets the slice counter to 1, via step 306. The master processor (Pm) wakes up the rest of the processors by setting the processor state to Active mode, and releases the semaphore, via step 308. Note that the master processor (Pm) can be any of the processors in the MP system (P0 to Pn).

Figure 4:
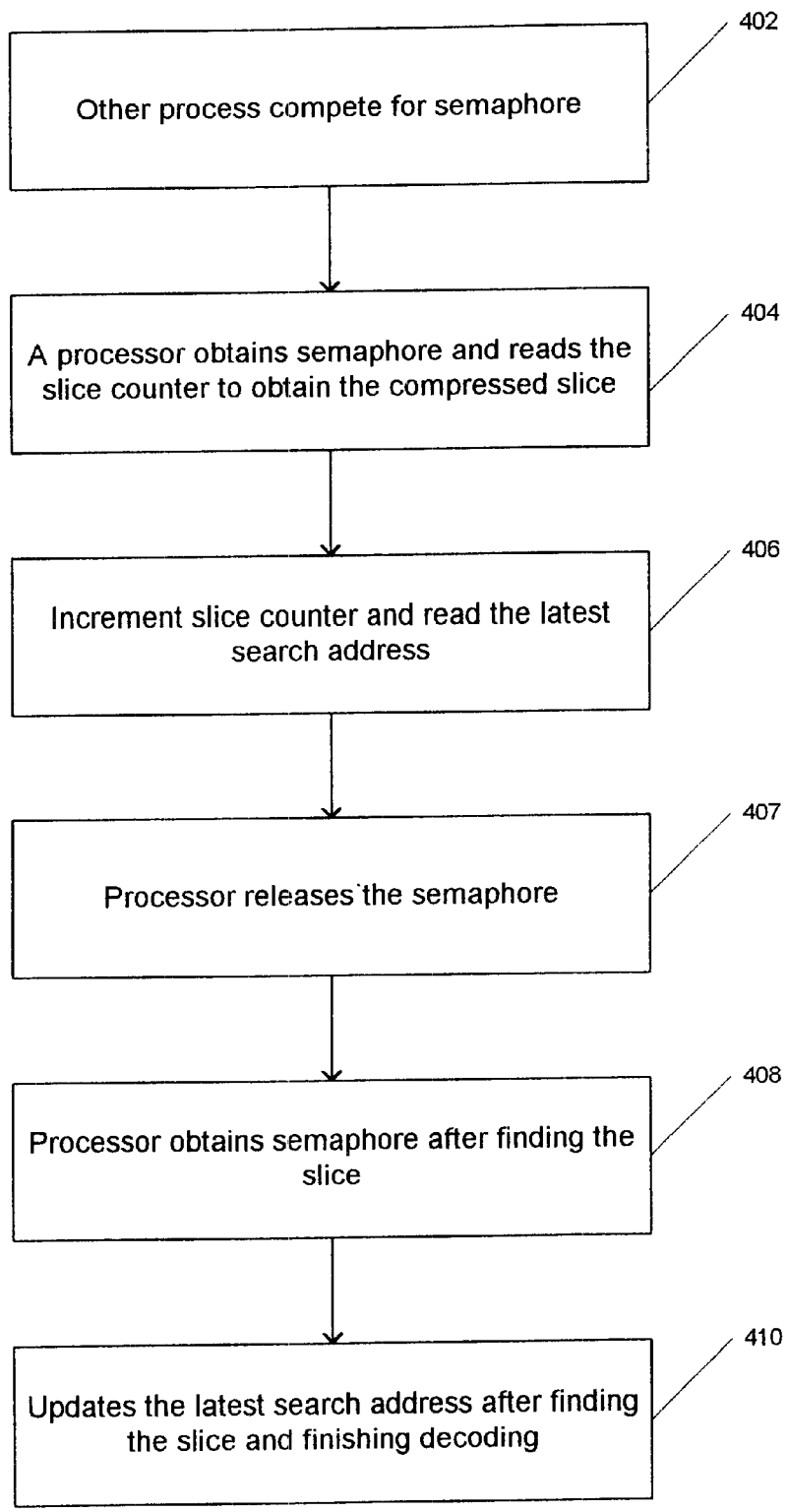
FIG. 4 is a simple flow chart of the slave processors in the multi-processor system after the master processor has awakened the slave processors.

FIG. 4 is a simple flow chart of the slave processors in the multi-processor system after the master processor has awakened the slave processors. First, all the processors (P0 to Pn) in the MP system will then compete for the semaphore in order to access the slice counter and latest search address of semaphore, via step 402. Once a particular processor (Pp) obtains the semaphore, it will read the slice counter to obtain the compressed slice # it is required to decode, via step 404, increment the slice counter, and read the latest search address for the address to start searching, via step 406. The processor then releases the semaphore, via step 407. The particular processor then obtains the semaphore after finding the appropriate slice, via 408 and updates the latest search address, via step 410, when (a) it finds the compressed slice #n, and (b) it has finished decoding the compressed slice number, unless the latest search address in memory has already advanced past the slice number.

All the processors will enter Sleep mode when the slice counter read is greater than the allowed slice # for that particular bitstream, except for the master processor (Pm). The master processor (Pm) will wait for all processors to go into Sleep mode, then processes everything above the picture-level until it reaches a new slice header (0x00000101).

This method and system is an improvement over conventional systems because the latest search address is constantly being updated by the processors (P0–Pn) in the MP 90 system. In fact, the higher the number of processors the higher the update rate, and consequently results in a more efficient search algorithm. In addition, the processors are not pre-assigned slice numbers. This ensures that the earliest free processor will be able to immediately work on the next slice, and optimally utilize the total computing power in the MP system.

FIG. 5 is a detailed flow diagram for Bitstream Decoding by the Master Processor. The system is started, via step. 502. Then it is determined if all other processors are in sleep mode, via step 504. If yes, the MPEG1/MPEG2 bitstream is processed up to compressed slice header, via step 506. Then, it is determined if the end of bitstream is detected, via step 508. If yes, then end 510. If the end has not been detected, last_search_address to current address is set and slice_ number is set to 1, via step 512. Then it is determined, if the semaphore is to be obtained, via step 514. If no, return to step 514.

If the semaphore is to be obtained, then the processor_state to Active mode for all processors is set, via step 518. Then, the last_search_address is obtained, via step 520. Next, the slice_number is obtained and the slice_number is updated to (slice_number+1), via step 522. Then, the semaphore is released, via step 524. Thereafter, it is determined if the slice_number is allowed, via step 516. If the slice_number is not allowed, return to step 504.

If the slice_number is allowed, the start of slice_number (slice header) is searched, via step 526. It is then determined if the semaphore is to be obtained, via step 528. If no, return to step 528. If the semaphore is to be obtained, the last_search_address is updated if necessary, via step 530. Then the semaphore is released, via step 532. Next, the slice #n is processed/decoded, via step 534. It is then determined if the semaphore is to be obtained, via step 536. If no, return to step 536. If yes, then the last_search_address is updated if necessary, via step 538. Then the processor_state is set to Active mode for all processors, via step 518.

FIG. 6 is a detailed flow diagram in MPEG Bitstream decoding for the slave processors. It is first determined if the semaphore is to be obtained, via step 604. If no, return to step 604. If the semaphore is to be obtained, then the processor_state is obtained, via step 606. Then the semaphore is released, via step 608. Then the processor_state is determined, via step 610. If the processor state is in Sleep Mode, then return to step 604. If the processor is in Active Mode, then it is determined if the Semaphore is to be obtained, via step 612. If no, return to step 612.

If the semaphore is to be obtained, then the last_search_address is obtained, via step 614. Then, the slice_number is obtained and the slice_number is updated to (slice_number+1), via step 616. Next, the Semaphore is released, via step 618. Next, it is determined if the slice number is allowed, via step 620. If not, the processor_state is set to Sleep Mode, step 622 when the processor state is in Sleep Mode. In Sleep Mode, wait, and return to step 604. If the slice_number is allowed, the start of slice_number is searched (slice header), via step 626. Then it is determined if the Semaphore is to be obtained, via step 628. If no, return to step 628. If the Semaphore is to be obtained, the last_search_address is updated if necessary, via step 630. Then the Semaphore is released, via step 632. Next, the slice #n is processed/decoded, via step 634. Then it is determined if the Semaphore is to be obtained, via step 636. If no, return to step 636. If the Semaphore is to be obtained, then the last_search_address is updated, if necessary, via step 638. Then, the Semaphore is released, via step 640 and return to step 604.

Accordingly, in a system and method in accordance with the present invention, pre-assigned compressed slices are not required. Instead, whenever a processor is free, it will control the semaphore to obtain sole access to the slice number and latest search address memory locations. The processor will obtain the next slice number, and increment the slice number in the memory. This ensures that the next slice will be processed at the earliest time, and not bounded by a particular pre-assigned processor. This scheme maximizes usage among all the processors in the MP system, and time required to decode the bitstream is reduced.

Therefore, in a system and method in accordance with the present invention there is reduction in both search time and processing time. This system provides a more efficient system for processing MPEG1/MPEG2 bitstreams in a parallel fashion.

Although the present invention has been described in accordance with the embodiments shown, one of ordinary skill in the art will readily recognize that there could be variations to the embodiments and those variations would be within the spirit and scope of the invention. Accordingly, many modifications may be made by one or ordinary skill in the art without departing from the spirit and scope of the appended claims.

What is claimed is:

1. A method for concurrent processing of slices of a bitstream in a multiprocessor (MP) system, the MP system including a plurality of processors and a memory, the memory for a receiving the bitstream as a plurality of slices, the method comprising the steps of:

(a) accessing a semaphore register by one of the plurality of processors;

(b) searching for an associated slice within the memory by the one processor;

(c) processing the associated slice by the one processor; and (d) updating a memory location which holds the latest search address of the associated slice by the one processor ; wherein subsequent processors search for each of the plurality of slices from the updated latest search address in the register.

2. The method of claim 1 which comprises updating the memory location which holds the slice number.

3. The method of claim 1 wherein the bitstream comprises an MPEG bitstream.

4. The method of claim 1 wherein the memory comprises a dynamic random access memory.

5. The method of claim 2 wherein the memory includes memory locations to the latest search address, slice number and processor state.

6. The method of claim 1 wherein the plurality of slices are compressed.

7. The method of claim 6 wherein the compressed slices are of variable length.

8. A system for concurrent processing of slices of a bitstream in a multiprocessor (MP) system, the MP system including a plurality of processors and a memory, the memory for receiving the bitstream as a plurality of slices, the system comprising the steps of:

means for accessing a semaphore register by one of the plurality of processors;

means for searching for an associated slice within the memory by the one processor;

means for processing the associated slice by the one processor; and means for updating a memory location which holds the latest search address of the associated slice by the one processor; wherein subsequent processors search for each of the plurality of slices from the latest search address in the register.

9. The system of claim 8 which comprises updating the memory location which holds the slice number.

10. The system of claim 9 wherein the bitstream comprises an MPEG bitstream.

11. The system of claim 8 wherein the memory comprises a dynamic random access memory.

12. The system of claim 8 wherein the memory includes memory locations to the latest search address, slice number and processor state.

13. The system of claim 8 wherein the plurality of slices are compressed.

14. The system of claim 13 wherein the compressed slices are of variable length.

* * * * *